A. R. THOMSON.
ANTISKIDDING DEVICE.
APPLICATION FILED DEC. 12, 1917.
1,360,600.
Patented Nov. 30, 1920.
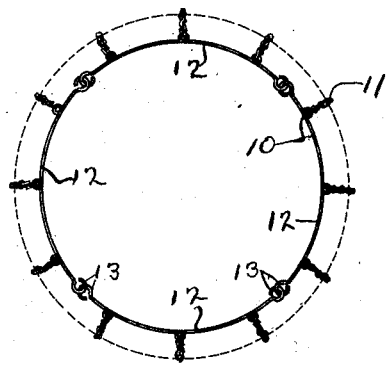
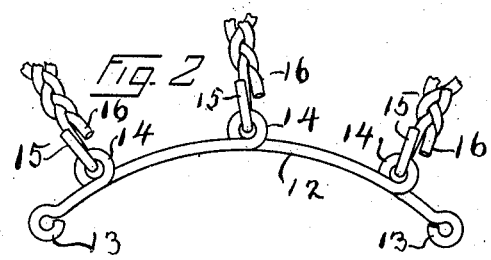
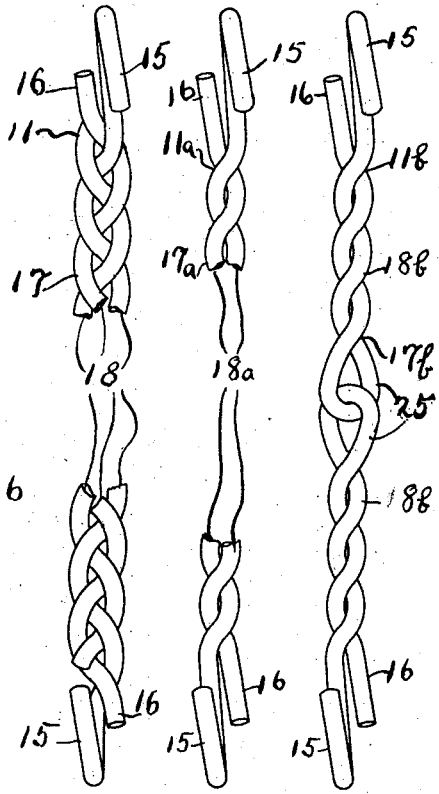
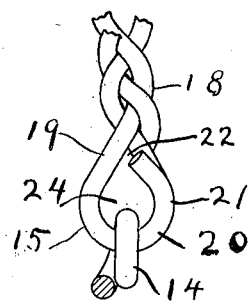
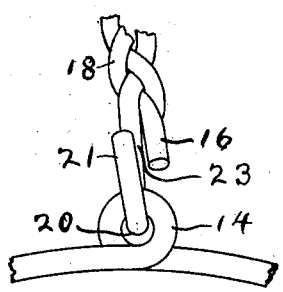
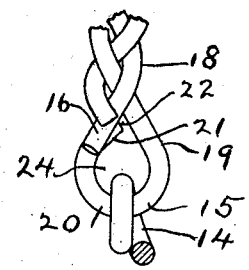
Inventor:
Albert Reddle Thomson
By Louis M. Schmidt
Atty.

UNITED STATES PATENT OFFICE.

ALBERT REDDLE THOMSON, OF PLANTSVILLE, CONNECTICUT, ASSIGNOR OF ONE-HALF TO NAPOLEON RINFRETT, OF SOUTHINGTON, CONNECTICUT.

ANTISKIDDING DEVICE.

1,360,600.      Specification of Letters Patent.      Patented Nov. 30, 1920.

Application filed December 12, 1917. Serial No. 206,790.

*To all whom it may concern:*

Be it known that I, ALBERT REDDLE THOMSON, a citizen of the United States, residing at Plantsville, in the county of Hartford and State of Connecticut, have invented certain new and useful Improvements in Antiskidding Devices, of which the following is a specification.

My invention relates to improvements in anti-skidding devices, particularly of the types shown and described in the application of Napoleon Rinfrett, the patent for which was issued to said Rinfrett and myself March 6, 1917, No. 1,217,999 and in my co-pending application filed May 4, 1917, Serial No. 166,453, and the object of my improvement is to produce improved means for joining the individual tread members to the side frame members such as to provide a relatively compact and diminutive joint structure, involving the use of a minimum number of parts, and which structure is such as to permit of readily connecting and disconnecting of these parts.

In the accompanying drawing:—

Figure 1 is a side elevation of a complete anti-skidding device, embodying my invention.

Fig. 2 is a similar view, on an enlarged scale, of one of the side frame sections shown in Fig. 1 and portions of the tread members connected thereto.

Fig. 3 is a plan view of one of the tread members.

Fig. 4 is a fragmentary side elevation, on a still further enlarged scale, of the junction structure of the side frame member and tread member.

Fig. 5 is an elevation of the same, as viewed from the right, relatively to the position shown in Fig. 4.

Fig. 6 is a similar or corresponding view, as viewed from the left.

Fig. 7 is a plan view of a tread member made with two strands of wire.

Fig. 8 is a similar view of a tread member made of two side members, formed of wire in each case, and the two being looped together, as in the Rinfrett patent mentioned.

My improved anti-skidding device comprises a pair of side frame structures 10 positioned when in use on opposite sides of the wheel to which the device is applied and a plurality of individual tread members 11 extending over the periphery of the tire and connected by their ends to the said side frame structures, all of the parts being made of wire, and which wire for heavy duty is made of relatively large diameter.

The side frame structures 10 are built up of a series of similar sections 12, as shown four in number, the adjacent sections being connected together permanently in the preferred form of construction by means of inter-engaged closed eyes 13 formed by bending the end portions of the material of which the said sections 12 are formed. Intermediate the eyes 13 the sections 12 are provided with loops 14 for receiving the tread members 11 formed by suitably bending the wire of which the sections are formed.

As shown, there are three loops 14 for each section 12, distributed along the length thereof.

The tread members 11 are of special construction and are separably connected to the loops 14, as will now be described.

The end portions of the tread members 11 comprise a hook 15 for engaging with the loops 14 and a guard 16 for preventing the accidental disconnection thereof, and between the said end portions is the body portion 17 that extends over the periphery of the tire, and constitutes the tread portion. The body portion 17 is formed of a plurality of strands 18 of wire, positioned side by side, and twisted together. In the structure shown in Figs. 1 and 3 there are three such strands 18.

The hook 15 is in each case formed from an extension of one of the strands 18 and the guard 16 is formed by an extension of another of the said strands 18. Thus two of the strands 18 are utilized for forming the connecting means for connecting the tread members 11 with the side frames 10. The third strand 18 is provided to add strength and life to the tread member, and additional strands may also be provided if desired to reinforce the tread member proper or body portion.

The hook 15 comprises the shank portion 19 that extends downwardly from the strand 18 to which it is connected, the bottom portion 20 that passes through the loop 14, and the upwardly extending free arm 21. The upper portion of the said free arm 21 is directed toward the shank 19 and the tip end thereof is separated from the said shank 19 by a space 22 such as to permit freely the passage therethrough of the wire of the loop 14.

The guard 16 extends downwardly from the end of the strand 18 to which it is connected, is of appreciable length, and is substantially in parallelism with the free arm 21, and, furthermore, is positioned generally in spaced relation thereto. The space 23 between the guard 16 and the free arm 21 is such as to provide a snug fit for the wire of the loop 14, so as to admit the same freely, or to admit the same by a slight springing of the material of the guard and free arm, according to the quality and rigidity of the material. Thus with heavy wire the structure would be relatively rigid, and there would be accordingly a minimum of springing of the material in connecting the parts.

Thus the complete connecting member for the tread members consists of the hook 15 and the guard 16, and the same is connected to the loop 14 by entering the wire of the loop 14 first in the space 22, which constitutes the mouth of the said connecting member, and then passing the said wire along the space 23 between the guard 16 and the free arm 21, the loop 14 finally entering the hook space proper, 24. In making the connection described a twisting movement of the parts is involved, which is reversed in disconnecting the parts.

In use the ordinary movements of the parts do not involve such twisting movement, so that the structure described is such as to provide a connection that is positive and reliable under ordinary conditions of use. In case of direct movement of the loop 14 along the free arm 21, disconnection of the said loop is prevented by the guard 16, which engages the loop 14 as the loop slides along the free arm 21, the loop bridging the space 23.

The tread member 11ª shown in Fig. 7 differs from that described above in having the body portion 17ª formed of only two strands 18ª of wire.

The tread member 11ᵇ shown in Fig. 8 is constructed after the manner of the Rinfrett patent as to the body portion 17ᵇ, being composed of two strands that are connected together by means of loops 25 at the middle, the strands 18ᵇ that constitute the arms of the loops being twisted together, and the two ends of the said strands being formed as a connecting member such as described, comprising a hook 15 and a guard 16.

The construction described provides a positive and reliable connection of the tread members with the side frames, and without the use of extra connecting members, such as separate plain hooks, or snap-hooks, and also permits of freely disconnecting the parts, and without the use of special tools or any tools whatsoever.

I claim as my invention:—

1. An anti-skidding device comprising in combination a pair of side frame structures having a plurality of pairs of mating loops and tread members connected individually by their ends to each of the said pairs of mating loops, the said tread members comprising each a body portion intermediate the said ends for extending over the periphery of the tire, and the said ends being composed of two strands of wire, one of the said strands being in the form of a hook for engaging with the said loop and having a gap for admitting the said loop, and the other of the said strands being in the form of a guard, positioned generally across the said gap and offset to one side thereof so as to provide a passage for the said loop between the said hook and the guard.

2. An anti-skidding device as described in claim 1 and the said hook and guard being in the form of extensions of the material of the body portion of the tread member.

3. In an anti-skidding device, a tread member having the end portions formed of two strands of wire and having the said end portions constructed and arranged suitably for connection with a loop of wire on a side frame, one of the said strands being in the form of a hook having a shank at the supporting end, a free arm adjacent the said shank, and a bottom portion connecting the said shank and free arm, the said free arm having its tip end opposed to the said shank and separated therefrom by a space for admitting the said loop, and the other of the said strands being in the form of a guard for the said hook, extending from the said shank downwardly and for an appreciable distance being positioned alongside of the said free arm and separated therefrom by a space, connected with the first mentioned space, also for admitting the said loop.

ALBERT REDDLE THOMSON.